Dec. 19, 1944.    W. P. LEAR    2,365,347
RADIO DIRECTION INDICATOR SYSTEM
Original Filed July 27, 1939    2 Sheets-Sheet 1
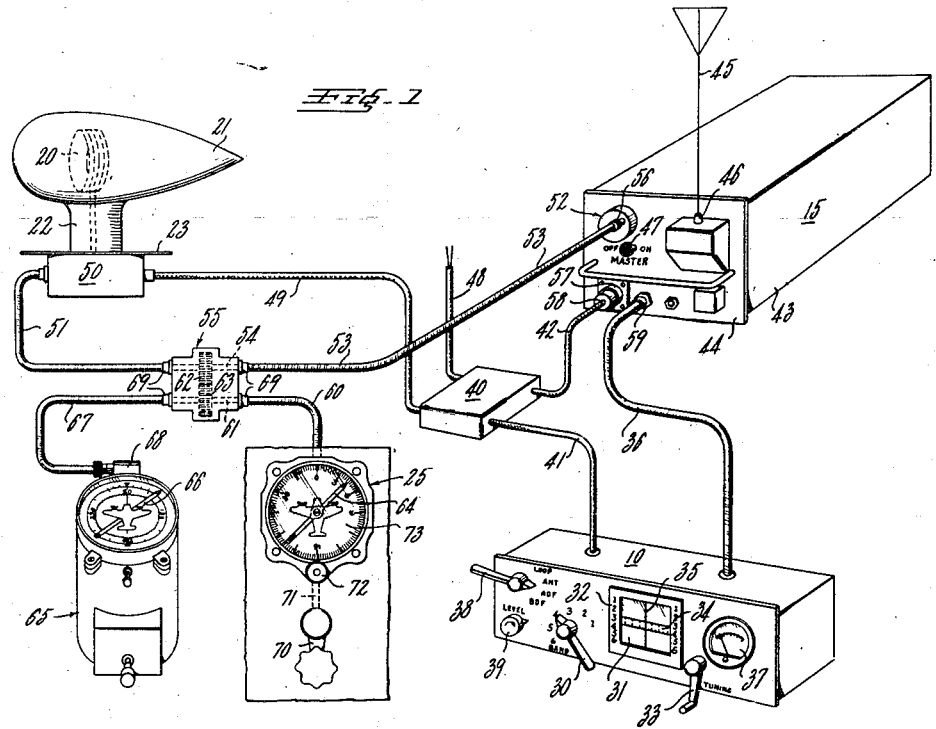
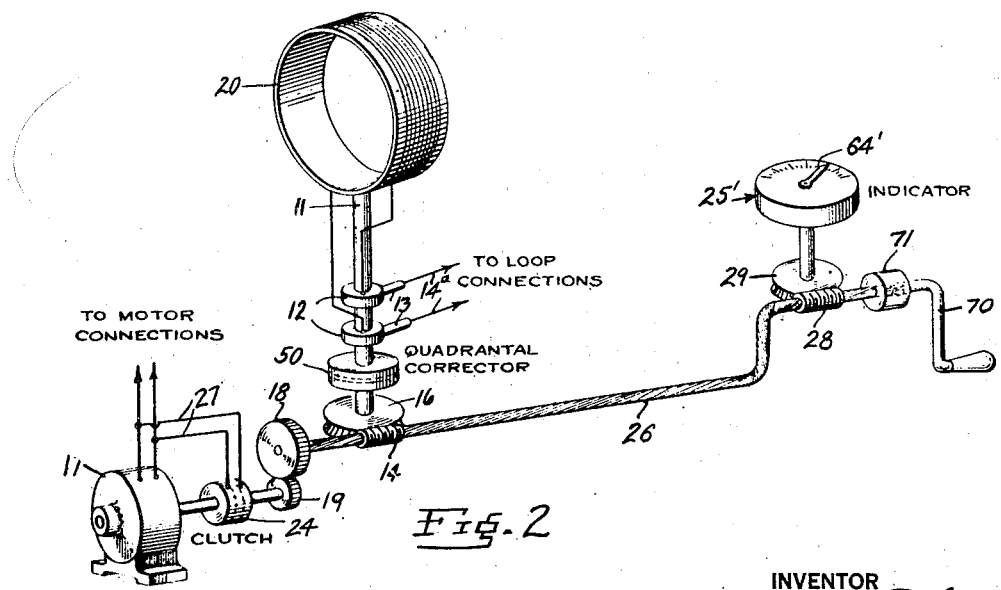
INVENTOR
William P. Lear
BY Richard A. Marsen
his ATTORNEY

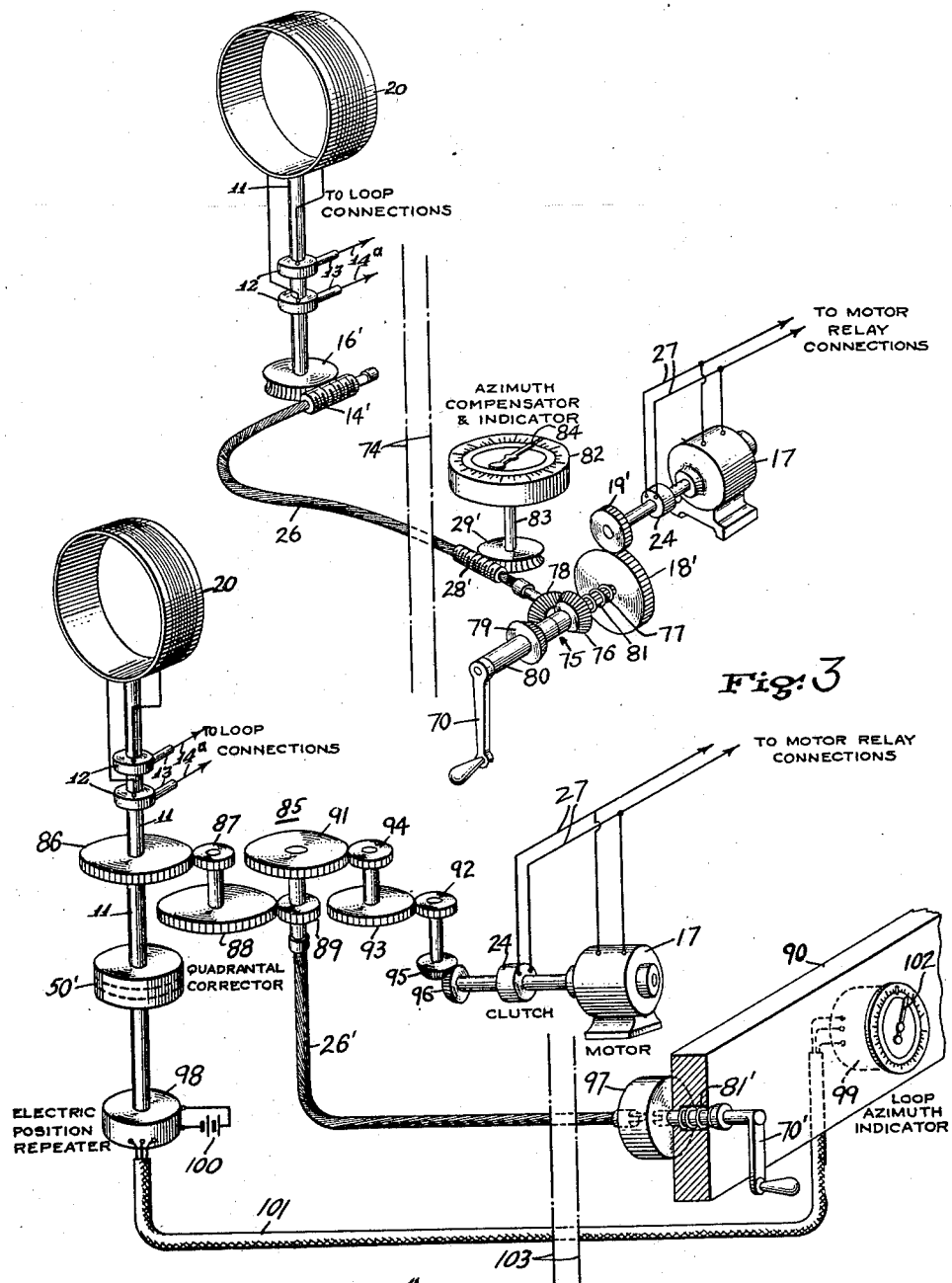

Patented Dec. 19, 1944

2,365,347

UNITED STATES PATENT OFFICE 2,365,347

RADIO DIRECTION INDICATOR SYSTEM

William P. Lear, Piqua, Ohio, assignor to Lear Avia, Inc., Piqua, Ohio, a corporation of Illinois Original applications July 27, 1939, Serial No. 286,733, and December 28, 1940, Serial No. 372,059. Divided and this application January 18, 1943, Serial No. 472,715

20 Claims. (Cl. 250—11)

The present invention relates to radio direction finding systems, and more particularly to automatic radio direction indicators. This case is a division of my copending applications Serial Numbers 372,059 and 286,733 filed on December 28, 1940, and July 27, 1939, respectively, now patents, No. 2,317,922 and 2,308,521, respectively, issued April 27, 1943, and January 19, 1943, respectively, and assigned to the same assignee as this case.

The automatic radio direction finder to which this invention relates employs a reversible electric motor controlled by the received radio signals for rotating a directional antenna in bearing relationship with the incoming radio waves. The directional antenna is generally a rotatable loop mounted on the exterior of the aircraft for efficient signal reception. A 360° indicator is mechanically coupled to the driven directional antenna to indicate its angular position and azimuthal bearing.

In accordance with the present invention, the control motor is arranged remote from the directional antenna, being incorporated in the electrical control compartment. As will be set forth in detail hereinafter, locating the control motor within a shielded chassis close to its electrical control circuits eliminates the electrical cables previously used and thereby electrical interferences with signal reception or the magnetic compass. The interference generally was manifest as switching clicks and commutator noise, or other electromagnetic waves radiated by the connecting cable. Furthermore, the motor is subjected to far less variation in temperature than when located adjacent the externally mounted loop antenna as heretofore. The result is a more stable operation.

A prominent feature of my invention consists in providing an automatic motor drive for a rotatable loop antenna through appropriate reduction gearing in combination with an independently usable remote manual drive for the loop antenna. In this connection an electromagnetic clutch, interposed between the motor and its normally associated gearing serves to disconnect the motor automatically from the loop antenna should the motor circuit become inoperative. Manual control of the loop through a normally disengaged clutch permits ready and unencumbered operation of the direction finder during such condition of the motor circuit. Also, manual control of the loop antenna is useful when radio reception by the loop during precipitation static conditions, or manual direction finding is otherwise indicated.

It is also a feature of the invention to include a quadrantal error corrector in the motor, manual-drive, loop antenna and indicator system in a manner insuring bearing indications always in corrected form, whether the loop is positioned automatically or manually.

These and other advantages, capabilities, and features of the invention will appear from the following detailed description of a specific embodiment thereof, illustrated in the accompanying drawings, in which:

Fig. 1 is a diagrammatic illustration of the system, in perspective, showing coaction of the components.

Figs. 2, 3 and 4 illustrate diagrammatically further practical forms of the system.

The automatic radio directional system, diagrammatically shown in Fig. 1, comprises a control unit 10, a radio and electrical control circuit unit 15, and rotatable directional antenna 20. Antenna 20 is a rotatably mounted loop within streamline housing 21 supported on neck 22. The antenna assembly is arranged on shell 23 of the aircraft, extending above or below the aircraft fuselage to insure efficient pick-up of the radio signals. The control unit or head 10 is placed near the pilot for remotely operating the direction finder system.

Chassis unit 15 contains the requisite radio and control circuits for the system, being generally located remote from the loop antenna, at a convenient accessible place for its maintenance and servicing. My Patent No. 2,308,521 referred to hereinabove, discloses appropriate circuits for effecting the automatic radio directional operation. A 360° indicator 25 is coupled to the direction finder system, being placed near the pilot for indicating the bearing position of loop 20.

A band selector switch 30 is provided on control head 10 for adjusting the radio circuits in units 10 and 15 to the desired band of radio frequency operation. Selector switch 30 simultaneously shifts shutter mask 31 of radio tuning indicator 32 in correspondence with the band selected. Details of this arrangement appear in my copending application, Serial No. 378,490, filed on February 12, 1941, now Patent No. 2,344,825, issued March 21, 1944. Tuning knob 33 operates a slide-rule type frequency scale 34 to indicate the frequency of the radio station tuned-in opposite stationary index 35. Tuning knob 33 at the same time rotates mechanical cable 36 coupled to the variable radio frequency condenser bank within chassis unit 15 for correspondingly tuning the contained direction finder circuits. A tuning meter 37, in circuit with the radio system, apprises the pilot of the optimum tuning conditions. The mode of circuit operation for the direction finder system is controlled by switch lever 38 of control head 10. The gain level of the system is adjusted by knob 39. The electrical connections between control head 10 and chassis unit 15 comprise junction box 40 and electrical cables 41, 42.

Chassis unit 15 contains a removable metallic casing 43 and front panel 44. Reference is directed to my copending application Serial No. 354,653, filed on August 29, 1940, now Patent No. 2,309,323 issued January 26, 1943, for preferred construction of this unit. The non-directional antenna 45 is connected to insulated terminal 46 on the front of unit 15. The master on-off switch 47 for the direction finder system is arranged on panel 44, remotely from control head 10. The power supply for the system is conducted through cables 42 and 48, via junction box 40. In this manner, the relatively high amperage current for the system does not pass through the aircraft or adjacent the instrument panel, thus avoiding any effects on the magnetic compass.

The loop winding 20 is of low impedance, and electrically connected to radio circuit unit 15 by low impedance shielded cable 49 through junction box 40 and cable 42. Connection between cable 49 and the rotatable loop antenna is afforded through slip rings. A quadrantal error corrector unit 50 is coupled between the rotatable loop antenna 20 and mechanical shaft 51 which operates the loop, in a manner such as indicated in my Patent No. 2,336,361, issued December 7, 1943 and assigned to the same assignee.

Loop drive shaft 51 is mechanically coupled to a drive unit 52 mounted on panel 44 of chassis unit 15, by flexible shaft 53 and shaft 54 of an H-coupling unit 55. Drive unit 52 incorporates an electromagnetic clutch, as will presently be explained. Shaft 53 is removably coupled to motor drive unit 52 by nipple arrangement 56. Electrical cable 42 is removably coupled to socket 57 on panel 44 through multiple plug 58. Control head shaft 36 is removably coupled to panel 44 by coupling piece 59. Chassis unit 15 may accordingly be readily uncoupled both electrically and mechanically from the remainder of the direction finder system for greatly facilitating its maintenance and servicing in the field.

The loop drive system is arranged in the control chassis unit 15, remote from the rotatable loop antenna 20. The motor is electrically shielded by housing 43. The cable connections to the motor are short and direct, and wholly within unit 15. No motor circuit connections are required between control unit 15 and the remotely positioned loop 20, thereby avoiding interference with the magnetic compass, or with the radio reception. Radiation of clicking and commutator noises is eliminated thereby.

The loop antenna 20 is mechanically driven by drive unit 52 through flexible mechanical shafting 51, 53 joined at H-coupling unit 55. Bearing indicator 25 is mechanically coupled to the mechanical loop drive system by flexible shaft 60 connected with shaft 61 of H-unit 55. Shafts 54 and 61 of H-unit 55 are connected by 1:1 gearing 62, 63. Indicator shaft 60 is accordingly positively related with motor drive shaft 53, following in phase with shaft 51, which controls the angular position of loop antenna 20. Pointer 64 of indicator 25 is directly geared to shaft 60 in the same ratio that the loop antenna 20 is geared to drive shaft 51. The angular relation between loop antenna 20 and pointer 64 is initially adjusted so that indicator 25 shows the proper azimuthal bearing positions of the loop. The quadrantal error corrector unit 50 automatically compensates the bearing indications for extraneous radio distortions, in a manner well known in the art.

Besides indicator 25, there is a second indicator unit 65, containing a radio bearing index 66. Index 66 is connected to H-coupling unit 55 through mechanical shaft 67. Indicator 65 coaxially coordinates the radio bearing indications with those of a gyro-compass within unit 65, in the manner disclosed in my copending application Serial No. 314,672 filed on January 19, 1940, and assigned to the same assignee. A gear ring supports index 66 and engages with a pinion at 68 in the ratio, equal to the gearing between loop antenna 20 and drive shaft 51, for in-phase driving therewith by shaft 67. The respective mechanical transmission shafts 51, 53, 60 and 67 are individually removably coupled to H-unit 55 through coupling nipples 69. It is to be understood that additional mechanical coupling units may be connected to drive shaft 53 or to any of the individual mechanical drive shafts, for operating additional remote indicators of the loop bearing positions.

The 360° quadrantal error corrector 50 provided between loop antenna 20 and the plurality of bearing indicators and motor drive unit 52 afford accurate azimuthal bearing indications at a plurality of positions on the aircraft. The indicators are thus individually interchangeable or removable, without affecting the operation of the remaining indicators. Coupling nipples 69 of H-unit 55 permit the convenient addition of an indicator if only one has been installed. Furthermore, when remote motor drive unit 52 is disassembled for servicing, the several indicators, 25 and 66, remain in in-phase relation with the loop antenna 20 and corrector 50, and need not be tested or readjusted after the servicing.

As already indicated, an important feature of the present invention resides in connecting a manual loop drive crank 70 or any other suitable manually actuated mechanism mechanically to indicator 25 and its drive shaft 60 through a connection 71 indicated in dotted lines. In the event that manual direction finding operation is indicated in flight, such as when the electric motor control unit 52 is disconnected or inoperative, direct drive of loop 20 and the associated radio indices 64 and 66, are effected through crank 70. Aural or visual null signal reception is then used with the system. According to my present invention, crank 70 is normally unclutched from connection 71 to prevent its rotation during automatic directional operation. An adjusting knob 72, is coupled to bearing scale 73 for displacing it from its indicated "zero" position whenever desired during navigation.

In Fig. 2, loop antenna 20, mounted upon rotatable shaft 11, is shown electrically connected to the loop transmission cable 14a through brushes 13, engaging slip rings 12 on loop shaft 11. A worm and worm gear drive 14, 16 for the loop is connected to motor 17 through a spur gear and pinion arrangement or train 18, 19 and electromagnetic clutch 24. Motor 17 and clutch 24 are connected to motor relays in the manner particularly described in my Patent No. 2,308,521. Rotation of loop 20 through the motor, clutch and indicated gearing occurs automatically. A further rotational control for loop 20 is provided through mechanical shaft 26 connected to handcrank 70 through clutch release member 71. Flexible mechanical shaft 26 is made sufficiently long to reach the cockpit, and corresponds to shaft 53 of Fig. 1.

Worm gearing 14, 16 has a predetermined reduction ratio to step down the speed of loop shaft 11 from that of flexible shaft 26, and a reduction ratio of 40:1 is sufficient for this relation. A second reduction is applied between gears 14, 16 and motor 17 through spur gearing 18, 19 which in the practical embodiment may have a 10:1 ratio.

Electromagnetic clutch 24 is electrically operated by the motor control circuit to automatically disengage motor 17 from loop shaft 26 and the drive gearing 18, 19. Such operation frees shaft 26 from the motor, and releases the latter as a load from the loop system when manually controlled by crank 70. In this connection, it may be noted that clutch 71 normally biases crank 70 out of engagement so that it will not turn when the loop is rotated by motor 17. The pilot engages clutch 71 when he desires to manually rotate the loop antenna. Moreover, in this form of the invention, the pointer 64 of mechanical loop position indicator 25 is driven by worm gearing 28, 29 with worm 28 secured to mechanical shaft 26. A negligible angular lag by shaft 26 provides accurate bearing indications through the indicator needle 64. A quadrantal corrector unit 50 is inserted in loop shaft 11 between gear 16 and loop 20. Quadrantal unit indicated at 50 is a mechanical arrangement for varying or otherwise compensating for the angular position of loop 20 with respect to drive gear 16 in accordance with determined electrical bearing distortions caused by metallic structural components of the aircraft. Thus, any position indicated by needle 64 will be the correct or compensated bearing corresponding to an electrical null or zero position of loop 20. Quadrantal error corrector 50 is merely indicated in schematic form and a suitable preferred construction thereof is described in my said Patent No. 2,336,361.

Fig. 3 shows a further form for the combined manual and automatic loop drive. In this example, motor drive 17 and associated electromagnetic clutch 24 are positioned near the handcrank 70 in the cockpit remote from loop antenna 20 as indicated by broken lines 74. Reduction spur gearing 18', 19' connects the clutch side of the motor drive to mechanical shaft 26 through reversible-drive gearing arrangement 75. Bevel gear 76 is slidably keyed on shaft 77 connected with gear 18', for engagement with bevel gear 78 secured to the end of flexible cable 26. Opposed bevel gear 79 is secured to crank shaft 80 and is mechanically separate from bevel gear 76.

Spring 81 normally mechanically biases bevel gear 76 into engagement with gear 78 so that motor 17 will be normally effective in rotating loop 20. Should the pilot desire to manually rotate loop 20, he simply grips the crank handle 70, presses it inwardly against biasing spring 81 to disengage the motor drive from gear 78 and engage bevel gear 79 therewith. Direct manual driving control of loop 20 is effected in this manner, independently of any energization of motor 17. In this example, gears 18', 19' are not driven, and free manual rotation of loop 20 is possible without hindrance from the motor or the associated gearing thereof. Manual rotation of loop antenna 20 in the embodiments shown in Figs. 2 and 3 does not entail rotation of motor 17. Furthermore, when loop antenna 20 is driven by motor 17, the crank handle 70 is mechanically disconnected and is not rotated.

An indicator 82 is mechanically connected to shaft 26 through worm 28' on shaft 26. Worm gear 29' meshes with worm 28'. Indicator 82 is coupled to gear 29' through shaft 83. A quadrantal or azimuth compensator is incorporated in indicator 82 so that the bearing indicated by needle 84 thereof is corrected for quadrantal errors. The worm 14'' on shaft 26 drives worm 16' on loop shaft 11, thus rotating loop 20 as already described.

Still another form for the combined manual and motor drive arrangement for rotatable antenna 20 is illustrated in Fig. 4. Motor 17 is associated with a multiple gearing system 85 connected to loop shaft 11. The train of gears comprising system 85 includes spur gear 86 secured to loop shaft 11 and associated pinion 87 meshing therewith in turn secured to spur gear 88 meshing with pinion 89. Pinion 89 is connected to the end of flexible shaft 26' extending to dashboard 90 of the cockpit. A further spur gear 91 is rotated rigidly with pinion 89 and coupled to pinion 92 through intermediate gearing 93, 94. The clutch side of the motor drive is coupled to pinion 92 through beveled gears 95, 96. The over-all ratio of gear train 85 between pinion 92 and loop gear 86 is of the order of 120:1 in a preferred arrangement for substantially increasing the motor speed for rotation of loop antenna 20.

The manual drive connection through crank 70' at dashboard 90 with gear train 85 through flexible shaft 26' is effected at an intermediate section of the gear train through a normally disengaged clutch 97. Thus, the manual turning effort by crank 70' upon loop 20 is at a lower reduction ratio than the motor 17 turning effort. Clutch 97 is schematically shown containing spring 81' biasing crank 70' out of engagement with clutch 97. When the pilot wishes to manually rotate loop 20, he presses crank 70' inwardly against spring 81' engaging clutch 97 and driving the loop through the intermediate gearing. Motor 17 and clutch 24 are not energized during the manual control, and the armature of motor 17 does not add to the mechanical load of the rotating system.

A mechanical quadrantal error corrector 50' is inserted in shaft 11 between loop 20 and electric position repeater 98. Electric position repeater 98 and associated loop azimuth indicator 99 correspond to a telemetering arrangement not shown herein, but fully disclosed in my Patent No. 2,308,521. A battery 100 energizes the position repeater units interconnected by cable 101. Indications by needle 102 of indicator 99 correspond to the azimuthal bearings due to the quadrantal error corrections by unit 50'. Broken lines 103 schematically indicate a remote position for dash-board 90, carrying crank 70' and loop position indicator 99.

Although I have illustrated several embodiments of my invention, it is to be understood that variations may be made falling within the broader principles and scope thereof, as defined in the following claims.

What I claim is:

1. In combination with a rotatable directional antenna a reversible electric motor for controlling the rotation of said antenna; mechanism for manually rotating said antenna comprising a crank, a cable joining said crank with said antenna and a member normally uncoupling said crank from said cable; and an electromagnetic clutch in circuit with said motor mechanically coupling said antenna and motor when said motor is energized to rotate the antenna and normally uncoupling said motor from the antenna when the motor is deenergized.

2. In combination with a rotatable loop antenna a reversible electric motor for controlling the rotation of said antenna; mechanism for manually rotating said antenna comprising a crank, a flexible cable mechanically joining said crank with said antenna and a member normally uncoupling said crank from said flexible cable; and an electromagnetic clutch in circuit with said motor mechanically coupling said antenna and motor when said motor is energized to rotate the antenna and normally uncoupling said motor from the antenna when the motor is deenergized.

3. In combination with a rotatable loop antenna, motive means for controlling the rotation of said antenna comprising a motor, reduction gearing and an electromagnetic clutch arranged to reversibly drive said antenna, mechanism for manually rotating said loop antenna including a crank and a flexible cable for mechanically joining said crank with said loop antenna, a 360° indicator remotely coupled to said loop antenna for showing the angular position thereof, and a quadrantal corrector between said antenna and said indicator for compensating the indications thereof to give proper directional radio bearings.

4. A radio direction finder system comprising a rotatable directional antenna, a 360° bearing indicator, a mechanical drive for driving said antenna with said bearing indicator, an electric motor coupled to said mechanical drive for operating said antenna and indicator, an electric control circuit for automatically operating said motor, an electrically controlled clutch associated with said circuit and disposed between said motor and mechanical drive for automatically disengaging said motor from the latter when the motor control circuit is deenergized and inactive, and manually actuated means for operating the antenna and indicator during an inactive condition of said motor.

5. A radio direction finder system comprising a rotatable directional antenna, a 360° bearing indicator, an electric motor coupled to said mechanical drive for operating said antenna and indicator, an electric control circuit for automatically operating an electrically controlled clutch associated with said circuit and disposed between said motor and the antenna and bearing indicator for automatically disengaging the motor from driving connection with said antenna and bearing indicator when the motor circuit is inoperative, a member for manually operating the antenna and indicator during the inactive condition of said motor control circuit, and normally disengaged clutch means coupling said antenna and indicator with said member.

6. A system for rotating a directional antenna of a radio direction finding system comprising a motor actuated mechanism for rotating said antenna, a manually actuated mechanism for rotating said antenna, means for disconnecting said motor actuated mechanism and self disengaging means for coupling said manually actuated mechanism with said antenna.

7. A system for rotating a directional antenna of a radio direction finding system comprising a motor actuated mechanism for rotating said antenna, a manually actuated mechanism for rotating said antenna, a member for coupling said motor actuated mechanism with said antenna, means for disengaging said coupling and a self disengaging coupling for coupling said manually actuated mechanism with said antenna.

8. A system for rotating a directional antenna of a radio direction finding system comprising a driving shaft, a gearing coupling said shaft with said rotatable antenna, a motor, a member for coupling said motor with said shaft, means for disengaging said shaft, a manually actuated mechanism for driving said shaft, means for coupling said manually actuated mechanism with said driving shaft and means for normally uncoupling said manually actuated mechanism.

9. A system for rotating a directional antenna of a radio direction finding system comprising a motor actuated mechanism for rotating said antenna, a manually actuated mechanism for rotating said antenna, a member for coupling said motor actuated mechanism with said antenna, means for disengaging said coupling, a self disengaging coupling for coupling said manually actuated mechanism with said antenna, a reduction gearing between said antenna and said motor actuated mechanism, and a second reduction gearing between said antenna and said manually actuated mechanism, the reduction ratio of said first reduction gearing being higher than the reduction ratio of said second reduction gearing.

10. A system for rotating a directional antenna of a radio direction finding system comprising a driving shaft, a gearing coupling said shaft with said rotatable antenna, a motor, a member for coupling said motor with said shaft, means for disengaging said shaft, a manually actuated mechanism for driving said shaft, means for coupling said manually actuated mechanism with said driving shaft and springs biasing said coupling means normally into their disengaged position.

11. A system for rotating a directional antenna of a radio direction finding system comprising a motor actuated mechanism for rotating said antenna, a manually actuated mechanism for rotating said antenna, gearing for coupling said motor actuated mechanism and said manually actuated mechanism with said antenna, said gearing having two positions one coupling said motor actuated mechanism with said antenna and the other coupling said manually actuated mechanism with said antenna, and means for biasing said gearing into the position in which it couples said motor actuated mechanism with said antenna.

12. A system for rotating a directional antenna of a radio direction finding system comprising a motor actuated mechanism for rotating said antenna, a manually actuated mechanism for rotating said antenna, gearing for coupling said motor actuated mechanism and said manually actuated mechanism with said antenna, said gearing having two positions one coupling said motor actuated mechanism with said antenna and the other coupling said manually actuated mechanism with said antenna, means for biasing said gearing into the position in which it couples said motor actuated mechanism with said antenna and a clutch for disconnecting said motor actuated mechanism provided between said gearing and said motor actuated mechanism.

13. A system for rotating a rotatable antenna of a radio direction finding system comprising a motor actuated mechanism for rotating said antenna, reduction gearing, including an intermediate section, for coupling said motor actuated mechanism with said antenna, a manually actuated mechanism, a driving shaft, a gearing connecting said driving shaft with the intermediate section of said reduction gearing and a self disengaging member coupling said driving shaft with said manually actuated mechanism.

14. A system for rotating a directional antenna of a radio direction finding system comprising an electric motor for rotating said antenna, a manually actuated mechanism for rotating said antenna, an electromagnetic clutch coupling said motor with said antenna, electrically controlled means for disconnecting said clutch should said motor become inoperative, and self disengaging mechanical means for coupling said manually actuated mechanism with said antenna.

15. A system for rotating a directional antenna of a radio direction finding system comprising a motor actuated mechanism for operating said antenna, a manually actuated mechanism for alternatively operating said antenna, an indicator for remotely showing the angular position thereof operatively coupled to said antenna, a quadrantal error corrector between said antenna and said indicator to provide proper directional radio bearings, means for disconnecting said motor actuated mechanism, and a self-disengaging coupling connecting said manually actuated mechanism with said antenna.

16. A system for rotating a rotatable loop antenna of a radio direction finding system comprising first and second bearing indicators; a motor actuated mechanism for rotating the antenna and said indicators; a manually actuated mechanism for rotating the antenna and said indicators; a quadrantal error corrector coupled to the antenna to provide proper directional bearings; gearing means mechanically coupling together said corrector, said motor actuated mechanism and said indicators; and a self disengaging coupling for connecting said manually actuated mechanism to said gearing means.

17. A system for rotating a rotatable loop antenna of a radio direction finding system comprising first and second bearing indicators; a motor actuated mechanism for rotating the antenna and said indicators; a manually actuated mechanism for rotating the antenna and said indicators; a quadrantal error corrector coupled to the antenna to provide proper directional bearings; gearing means mechanically coupling together said corrector, said motor actuated mechanism and said indicators; and a self disengaging coupling for connecting said manually actuated mechanism to one of said indicators.

18. A system for rotating a rotatable loop antenna of a radio direction finding system comprising first and second bearing indicators; a motor actuated mechanism for rotating the antenna and said indicators; a manually actuated mechanism for rotating the antenna and said indicators; a quadrantal error corrector coupled to the antenna to provide proper directional bearings; gearing means mechanically coupling together said corrector, said motor actuated mechanism and said indicators; a self disengaging coupling for connecting said manually actuated mechanism to said gearing means; said motor actuated mechanism including an electric motor and clutch means effective, upon energization of said motor, to connect the same to said gear means and, upon deenergization of said motor, to disconnect the same from said gear means; and circuit means responsive to signals received by the antenna for controlling operation of said motor and said clutch means.

19. A system for rotating a rotatable loop antenna of a radio direction finding system comprising a motor actuated mechanism for rotating the antenna; a manually actuated mechanism for rotating the antenna; a flexible drive shaft connected to the antenna; gearing for coupling said motor actuated mechanism and said manually actuated mechanism to the antenna, said gearing having two positions, one coupling said motor actuated mechanism with the antenna and the other coupling said manually actuated mechanism with the antenna; means for biasing said gearing into the position in which it couples said motor actuated mechanism with the antenna; a clutch for disconnecting said motor actuated mechanism interposed between the same and said gearing; a bearing indicator; gear means connecting said indicator to said flexible drive shaft; and a quadrantal error corrector interposed between said indicator and gear means to provide proper directional bearings on said indicator.

20. A system for rotating a rotatable loop antenna of a radio direction finding system comprising a motor actuated mechanism for rotating the antenna; a manually actuated mechanism for rotating the antenna; a quadrantal error corrector coupled to the antenna to provide proper directional bearings; a self disengaging coupling for connecting said manually actuated mechanism to the antenna; a clutch for disconnecting said motor actuated mechanism interposed between the same and the antenna; a bearing indicator; an electrical position transmitter coupled to said corrector; an electrical position receiver coupled to said indicator; and circuit means connecting said transmitter to said receiver.

WILLIAM P. LEAR.